March 4, 1941.  F. S. BAIRD ET AL  2,233,508
GAS SYSTEM
Filed Jan. 24, 1938
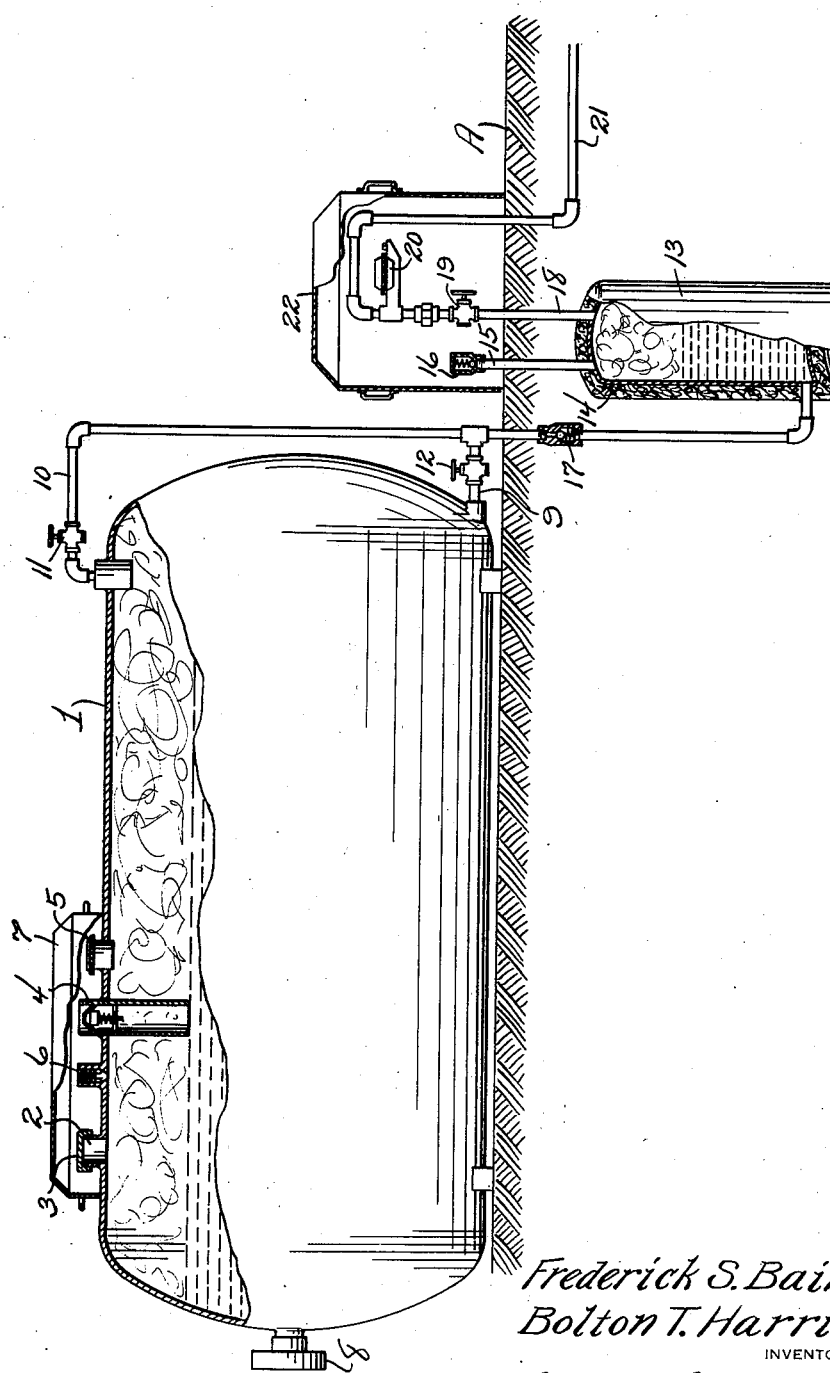
Frederick S. Baird
Bolton T. Harris
INVENTORS
BY Victor J. Evans & Co.
ATTORNEYS Patented Mar. 4, 1941

2,233,508

UNITED STATES PATENT OFFICE 2,233,508

GAS SYSTEM

Frederick S. Baird and Bolton T. Harris, Little Rock, Ark.

Application January 24, 1938, Serial No. 186,755

3 Claims. (Cl. 62—1)

This invention relates to gas plants of the butane type primarily used in rural districts for domestic and similar uses and has for its primary object the provision of a system which assures efficient operation in summer and winter weather and permits the main or major supply tank to be located above the surface of the ground so that care such as the painting of the tank may be easily carried out to prevent rusting and corrosion thereof and the use of a small auxiliary tank properly treated against deterioration due to the action of moisture and other elements of the surrounding ground thereon yet being heat-conductive in character and located below the surface of the ground and connected to the house supply line and the main tank in such a manner that gas may be supplied to the auxiliary tank from the main tank in warm or summer weather and liquefied gas may be supplied to the auxiliary tank from the main tank for vaporization during cold or winter weather, the vaporization being brought about by the auxiliary tank being buried in the ground below the frost line and kept warmer than the main tank.

With these and other objects in view, this invention consists in certain novel features of construction, combination and arrangement of parts to be hereinafter more fully described and claimed.

For a complete understanding of our invention, reference is to be had to the following description and accompanying drawing, in which the figure is a fragmentary side elevation, partly in section, illustrating a gas system constructed in accordance with our invention.

Referring in detail to the drawing, the character A indicates the surface of the ground and mounted above the surface of said ground is a main tank 1 in which is placed liquefied gas through the medium of a filling neck 2 normally closed by a removable cap 3. The main tank 1 is also provided with a conventional overflow pipe 4 with obvious means (not shown) to prevent the tank from being filled with liquefied gas beyond a predetermined amount and having a conventional, normally closed, but inwardly openable check valve in its outer end portion to prevent the escape of gas from the tank. The main tank is also provided with a pressure gage 5 of any well known construction and with a pressure relief valve 6. To enclose the gage, relief valve, filling neck and the overflow pipe a removable cover 7 is provided. One end of the tank is provided with a conventional type of rotary gage 8 for indicating the level of the liquid in the tank.

An outlet pipe 9 is connected to one end of the tank adjacent the bottom and an outlet gas pipe 10 is connected to the top of the tank adjacent said last named end. A control valve 11 is located in the pipe 10 and a control valve 12 is located in the pipe 9. These pipes are connected together and extended into the ground for communicable connection with the lower portion of an underground auxiliary tank 13. The auxiliary tank, as shown at 14, may be directly painted with a suitable protective coating material and then provided with an outer covering of steel wool or other suitable metallic fibrous material to keep the tank from direct contact with the surrounding soil or otherwise treated externally to prevent rusting and corroding but permitting heat transfer through the walls thereof. The tank 13 is located in the ground well below the frost line and connected to the top thereof is a vent pipe 15 having a relief valve 16 capable of withstanding a predetermined pressure of gas within the auxiliary tank. A check valve 17 is located in the pipe connection between the main tank and the auxiliary tank and acts to permit flow of either liquefied gas or gas from the main tank to the auxiliary tank but preventing flow in the opposite direction. An outlet pipe 18 is connected to the top of the auxiliary tank and extends above the surface of the ground and has connected therein a control valve 19 and a regulating valve 20. The outlet pipe 18 after passing above the surface of the ground is returned to extend under the ground for connection with the service pipe 21 of a house or like device. It is preferable that the service pipe be located below the frost line in the ground.

In summer weather the control valve 12 is closed and the control valve 11 is opened. The liquefied gas in the main tank in summer weather is vaporized and passes to the auxiliary tank 13 and thence to the service pipe 21 in regulated amount. In winter weather the valve 11 is closed and the valve 12 is opened allowing liquefied gas to gravitate into the lower portion of the auxiliary tank and partially fill the same as indicated in the drawing. The auxiliary tank being buried in the ground is kept warm so that the liquefied gas will vaporize in the auxiliary tank and pass therefrom in the service pipe in regulated amount. In this connection, it is noted that in cold weather the pressure in the upper portion of the auxiliary tank is greater than the pressure in the main tank because of the regulated flow of gas from the auxiliary tank through the service pipe to the utility where the gas is consumed and the accumulation of the gas resulting from the vaporization of the liquefied gas received in the auxiliary tank. Hence, the liquefied gas will never completely fill the auxiliary tank but only partially fill it as just above noted. Having the main tank located above the surface of the ground permits better care to be taken thereof so as to prevent corrosion and rusting. The use of the auxiliary tank embedded in the ground assures successful operation of the system in the winter time.

The outlet pipe 18 and the valves thereof which are located above the surface of the ground are protected by a casing 22.

What is claimed is:

1. In a gas system of the character described, a service pipe located in the ground to prevent condensation of gas passing therethrough, a permanently installed main tank located above the surface of the ground to contain and vaporize liquefied gas, and selectively controllable means communicably connecting the main tank to said service pipe and including piping and an interposed underground auxiliary tank for the transmission of gas from the main tank to said service pipe in warm weather and for the reception and vaporization of liquefied gas from the main tank to accordingly supply the service pipe with gas in cold weather, said auxiliary tank being encased in a protective covering to keep the tank from direct contact with the surrounding soil but of inherent conductivity to maintain the flow of heat from the soil to the tank.

2. In a gas system of the character described, a service pipe located below the frost line in the ground to be thereby naturally heated so as to prevent condensation of gas passing therethrough, a permanently installed main tank located and exposed throughout the extent thereof above the surface of the ground to contain liquefied gas capable of vaporization at certain temperatures within the main tank, an auxiliary tank embedded below the frost line in the ground to be thereby naturally heated so as to prevent the contents thereof from condensing, a branched pipe connected communicably to the upper and lower portions respectively of said main tank and to the auxiliary tank and having selective controlling valves whereby gas from the upper portion of the main tank may be conducted to the auxiliary tank or liquefied gas may be conducted from the lower portion of the main tank to the auxiliary tank alternatively, a relief valve connected to the auxiliary tank and located above the surface of the ground, means communicably connecting the auxiliary tank to the service pipe and including a regulator and a control valve located above the surface of the ground, and a protective casing for the above-surface parts of said means.

3. In a gas system of the character described, a service pipe located in the ground to be thereby naturally heated so as to prevent condensation of gas passing therethrough, a permanently installed main tank located and exposed throughout the extent thereof above the surface of the ground to contain liquefied gas and in which said liquefied gas may vaporize during warm weather, an auxiliary tank embedded in the ground to be thereby naturally heated so as to cause vaporization of liquefied gas therein and maintain the product of vaporization in its gaseous state, means communicably connecting the auxiliary tank from the top thereof to the service pipe, and selectively controllable means for alternatively supplying either liquefied gas or gas resulting from vaporization of the liquefied gas in the main tank to the auxiliary tank, at will.

FREDERICK S. BAIRD.
BOLTON T. HARRIS.